United States Patent
Spence-Bate

[11] 3,826,571
[45] July 30, 1974

[54] LENS MECHANISM

[76] Inventor: Harry Arthur Hele Spence-Bate, 85 Seabourne Rd., Southbourne, Bournemouth, England

[22] Filed: Apr. 6, 1973

[21] Appl. No.: 348,622

[30] Foreign Application Priority Data
Apr. 8, 1972  Great Britain..................... 16341/72

[52] U.S. Cl....................... 355/46, 355/20, 355/43, 355/65, 355/66, 350/34, 350/39, 350/254
[51] Int. Cl. ......................................... G03b 27/70
[58] Field of Search............ 355/46, 20, 55, 40, 43, 355/89, 64, 65, 66; 95/1.1; 350/34, 39, 254

[56] References Cited
UNITED STATES PATENTS
3,511,565  5/1970  Harman et al..................... 355/64 X
3,673,933  7/1972  Hamann............................. 355/65 X
3,689,149  9/1972  Livingood............................ 355/46

FOREIGN PATENTS OR APPLICATIONS
1,241,840  6/1960  France................................. 355/55

Primary Examiner—Robert P. Greiner
Attorney, Agent, or Firm—Fidelman, Wolffe Leitner & Hiney

[57] ABSTRACT

A camera for selectively filming at least two separate types of input images through a first and second object lenses respectively. A mask is positioned between the film and a rotatable lense carrier upon which is mounted the first object lense and mirror which directs the image of the second object lense to the film. The camera may be a microfiche camera for recording a document through the first object lense and for recording the image from a cathode ray tube through the second object lense.

8 Claims, 6 Drawing Figures

LENS MECHANISM

The present invention relates to cameras and more particularly to the problem of recording images from at least two possible sources on a film.

Such a problem is present in microfilm and microfiche technology where it is a requirement to feed an image from, for instance, a document to be recorded via one set of lenses to a film whilst there also exists a requirement to record on the same film a further image from say a cathode ray tube to be recorded via a second set of lenses set at a different focal length.

In the past the problem of recording information where different focal lengths has been required was solved by altering the focal length of the camera and repositioning the camera relative to the image to be recorded.

Clearly the time taken to refocus and reposition is considerable and the complexity of the mechanism required to do this is considerable. In the field of microfilm and microfiche recording where large numbers of records can be recorded quickly with perhaps some records being fed via a cathode ray tube and some by presentation of a printed document it is a necessity to achieve flexibility of recording with as little expenditure of time as possible.

The present invention therefore consists of a camera including at least two object inputs fed through a rotatable carrier, the carrier being arranged to pass the input to a film, whereby at least partial rotation of the carrier allows selection of a required input.

The provision of such a camera enables an operator to change the input from say a conventional visual source such as a printed document to the input of a cathode ray tube by partial rotation of the carried so as to bring to feed the cathode ray tube input to a film. It also allows for changes of the optical systems as a result of which, the size, magnification and orientation of images can be varied within a large range, while maintaining high resolution performance throughout the chosen spectrums.

In a microfilm or particularly in a microfiche camera this can be used for updating a first microfiche. Updating can be achieved using the invention by using a scanning device to read the image of the first microfiche to be updated and feeding this image to the cathode ray tube input of the camera and recording this image in one operation on the film whilst in a second operation the carrier is partly rotated to bring an image of an updating document into the 'view' of the camera where a conventional photograph is taken. In this way the film of the camera of microfiche size can be formed into an updated or second microfiche to supercede the first microfiche.

In a further embodiment the cathode ray tube input can be fed with images from a computer storage hereafter called "COM" whilst the aforesaid conventional source of input hereafter called "CON" can also be used. Such a system will hereafter be referred to as a COM/CON system. This system also allows for super imposition of one image on another. Last minute additions can also be made. These alternatives are allowed for in the same piece of equipment which is by the means provided very compact and inexpensive to manufacture.

In a further embodiment there is provided a shutter for controlling the exposure length as well as controlling a mask required for a chosen size of image on a microfiche film.

The invention will now be described with reference to the accompanying drawings of embodiments of the invention, in which:

FIG. 1b shows an elevation of FIG. 1a.

FIG. 1c is an inverted plan of FIG. 1a.

Figure 1A:
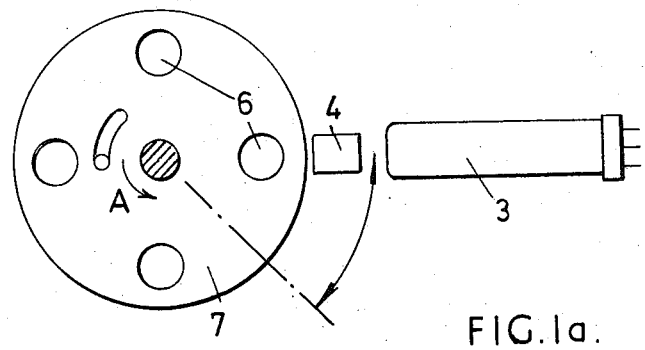
FIG. 1a shows a plan view of a rotatable carrier for a microfiche camera according to one simple version of the invention.
Figure 1B:
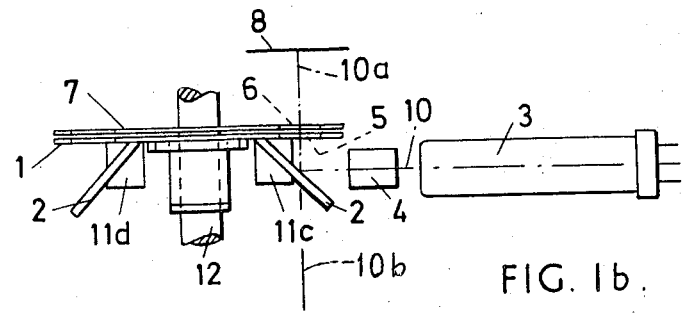
Figure 1C:
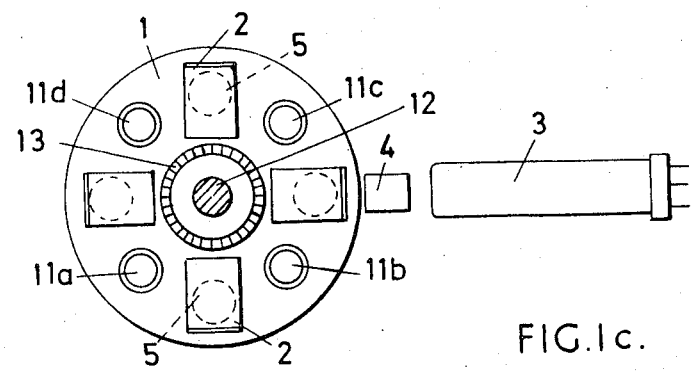

The device shown in FIGS. 1a to 1c show a rotatable lens carrier 1 on which are mounted four mirrors 2 one of which is set in the optical path 10, 10a between a cathode ray tube 3 a lens 4 an aperture 5 in the lens carrier plate 1, a second aperture 6 in an aperture plate 7 and a film 8.

The optical path 10, 10a is used for the COM mode. Clearly the optical arrangements are such that the lenses and apertures can be preset for the cathode ray tube.

Also mounted on the lens carrier are four lenses 11a, 11b, 11c and 11d. These can be rotated into line with optical path 10a by 45° or more rotation of carrier plate 1 and thus allows the camera to take CON photographs of a document along optical path 10a, 10b. With four lenses mounted on the carrier plate four different preset lenses can be made available to the operator. Further it can be seen that 45° angular movement of aperture plate 7 in direction A enables lens 11c to be rotated into line with aperture 6 thus provide an optical path 10c, 10a from a document through lense 11c, aperture 6 to the film 8.

The aperture and carrier plates can be driven relatively to one another by shaft 12 fixed to plate 7 and gear toothing 13 fixed to plate 1.

The plurality of apertures in this embodiment have been made so that any switch-over from COM to CON or CON to COM can take place very quickly, and as drilling of a hole costs very little one can be very lavish on these, the incidental advantage being that it relieves weight at the same time. In the drawing a 45° angular movement effects switch-over, but by increasing the number of holes this angle can be correspondingly reduced if a shorter movement is found advantageous. For example if a short throw solenoid is used there would be a practically instantaneous change-over from COM to CON or vice versa. The lens turret uses conventional threads or bayonets so that a large selection of standard available lenses can be used thus giving the user a large choice not only to quality but also price. However in 95 percent of programmes three turret lenses are adequate for multiple practical programmes.

Figure 2:
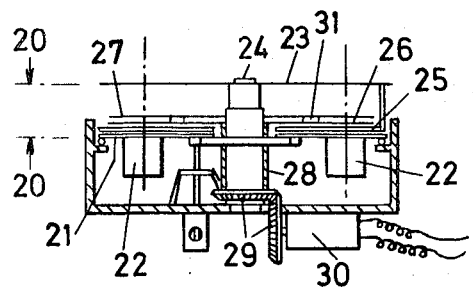
FIG. 2 shows a sectional elevation of a second embodiment according to the invention.

FIG. 2 shows a part of a second embodiment of the camera showing an improved version of lens carrier and CON/COM change-over arrangement from FIG. 1. In this second embodiment the whole arrangement of shutters etc. have been taken into account and allowance provided for very short back focal length lenses to be accommodated between the arrows 20 which indicate the distance between the lens carrier plate 21 on which lenses 22 are mounted and a mask plate 23 which is in the back focal plane. In this embodiment the mask plate 23 is adjustably mounted for axial movement on the central arbor 24 so as to accommodate lenses of different back focal length. The mask plate 23 is also rotatable to bring different mask sizes for different formats such as A4 or Foolscap, and the mask plate 23 is attached for rotational movement to the aperture plate 25. Between the aperture plate 25 and mask plate 23 is a shutter blade 26 and capping blade 27. The shutter blade 26 is driven via a hollow arbor 28 and gearing 29 by a motor 30. The capping blade 27 may be driven or not by the engagement or disengagement of friction pads 31 mounted between the capping blade 27 and shutter blade 26. The plates 21 and 25 can move angularly to one another. This is the CON/COM switch-over movement described earlier. The plates are biased in such a way that normally they are in the turret lens mode this depending on the main use of the instrument. In this mode lenses are turned in by hand in accordance with a chosen CON programme and the top turret plate clicks into position. The combined turret rotates in an shouldered ring, this in turn is attached to a suitable supporting means, on the camera body. In the COM mode a small angular movement takes place in the split turret this allows the light rays to pass through the turret plates (there are apertures or cut-outs in the upper turret plate) and to the mirror or partially silvered mirror, thus switching photography to the cathode ray tube lens, the tube and its intelligence and the camera then becomes part of the computer and takes its commands from it.

An alternative way of arranging the lenses and mirrors is to mount every lens and mirror on a separate plate or support and imparting movement only to these parts but then the mechanics become more involved.

The circular shutter blade in this second embodiment is of the constantly rotating type with a cut-out in the blade, shutter exposure speed being governed by varying the r.p.m. of the driving motor 30. The rotating mask plate 23 is similar in operation to a waterhouse-stop, the mask and the turret are linked to each other in operation, preferably mechanically, in order that the correct lenses and masks are always used together in accordance with a programme chosen by the operator.

The whole arrangement shown in FIG. 2 centres around a round column which is part of the supporting ring previously mentioned. The base to the pillar column need not be solid but made as spikes to a wheel thus allowing ample space for light rays to pass. In practice three spikes would probably be used, two of the gaps could be webbed as a ducks foot so as to give a supporting plate to motors and solenoids etc. and one sector would be left open for the purpose already mentioned. The capping blade 27 can either be separately powered or driven by the small friction pads 31 riding on the shutter blade. The capping blade is released only when necessary and this is synchronised to the shutter blade cut-out. The synchronisation can be most easily provided from the motor shaft driving the shutter blade.

The detailed mechanics of the CON/COM switch-over consist of a toothed, or similar, circular ring similar to that which can be seen in FIG. 1 on the underside of the lower circular lens turret plate. The teeth are of a saw-tooth type so that the engagement can ride-over in one direction of rotation but locks in the other in the latter drive takes place, while the former is used when the operator turns in the lens for a required programme. Thus the CON/COM change-over can take place at any position around the turret. For this reason no variation has to be made to the mechanics, however many or few lenses or apertures are employed. A slot limiting the movement of the two plates to one another can be seen in the top circular turret plate. A cut-out for a spring (not shown) can be placed anywhere in the plates and the bias applied make this operate as a turret in the normal way. By means of a solenoid or tensioning spring which is wound-up by a motor, the lower plate is moved angularly (this has already been mentioned) to remove the turret lens from the optical axis and replace this by the mirror. On return to CON (OR COM depending on the initial bias) the solenoid and the lens is returned by means of the bias spring or, alternatively, by reversing the polarity of current applied to a D.C. magnet or solenoid.

Figure 3:
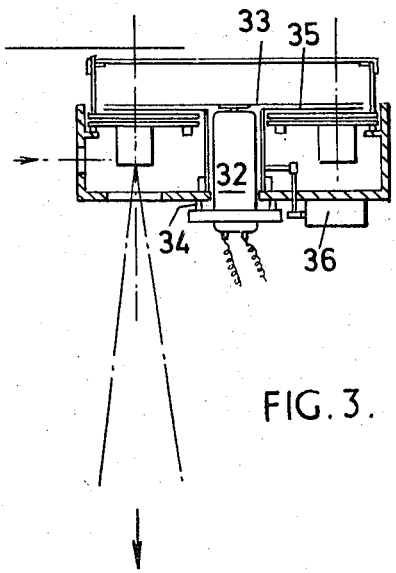
FIG. 3 shows a sectional elevation of a third embodiment according to the invention.

In FIG. 3 there is a third embodiment, here the motor 32 drives the shutter blade directly and the motor is mounted on an anti-vibration mounting 34, thus isolating the motor completely from the rest of the device. The capping blade 35 then has to be placed below the shutter blade 33 and is then not self-powered and requires a separate selenoid 36 or similar activator. In this case the capping blade 35 need only be a section of a disk. From these examples one can see, that the layouts can be varied but the functions and operation remain fundamentally the same. In a disk type capping blade clear and opaque spaces can alternate, therefore no reciprocating movements need be employed.

Figure 4:
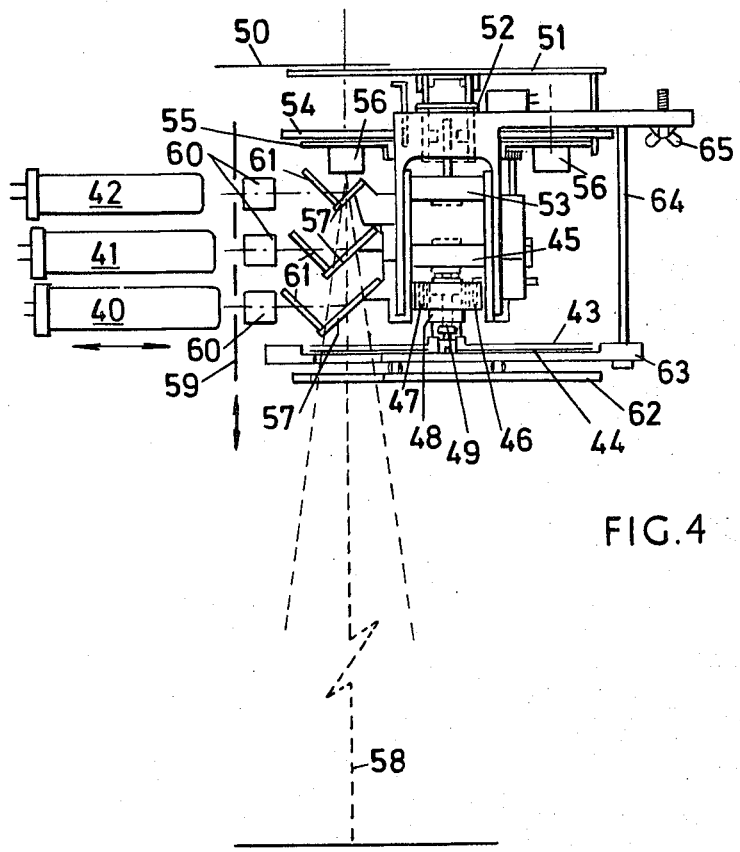
FIG. 4 shows a sectional elevation of a fourth embodiment according to the invention.

In FIG. 4 rotatable lens carrier, aperture plate and shutter are combined into a fourth embodiment known as a CON/COM MULSUP unit, MULSUP standing for "multi-superimposition." The MULSUP mode is provided by two additional cathode ray tubes 40 and 41 which act as supplemental to the COM cathode ray tube 42.

The fourth embodiment has a different shuttering arrangement which is a kind of rotary focal plane shutter and which consists of two circular blades 44 and 43 with cut-outs, the exact shape depending on various factors of the shutter operation. In one method the first blade releases so as to uncover the lens and the second closing blade is held back by a timing device which can be purely mechanical as on a number of focal plane shutters or electro-mechanical, the latter for example by employing release solenoids which are controlled electronically and can thus, in addition to initiating the releases, be used through a photo-cell monitor to meet the light exposure requirements. The physical side of the release can be applied either directly to the blades or anywhere along the blade drive mechanism whichever is mechanically more convenient. If two pawls are directly used on the blades the stopping part of the operation has to be cushioned-off but as there is plenty of angular movement available, shutter bounce prevention is not necessary. The drive for the shutter blade is provided by a motor or rotary solenoid 45 and the shutter blade motion depends on springs and/or escapements (or compressed air etc.). One version of such a shutter will now be described in detail.

The motor 45 (motor geared down or a specially adapted rotary solenoid) turns a drum 46 with two identical springs 47 in it. Connected to the springs are two coaxial arbors 48 and 49, one sleeving into the other so that each can rotate separately. When the drum 46 is rotated and the arbors 48 and 49 are prevented from rotation, the springs are simultaneously wound-up. In practice the springs are of course pre-tensioned in order to produce more instant power. The arbors 48 and 49 connect to the circular shutter blades 44 and 43 the manner how this is to be done will be described presently. The arbors 48 and 49 in their turn are arrested by means of the shutter blades 44 and 43 being held captive, for example by pawls, which are released when required by solenoids.

Drive and power in a further embodiment can consist of compressed air of vacuum supplies of power which can be translated into mechanical movement especially as these supplies may already be available on some cameras for example as a means of lifting and/or holding microfiche laminae flat.

Under film plane 50 a format-mask disk 51 is provided in the manner of a waterhouse-stop. A coded disk (or track on the shaft) can be attached to the underside of the mask or any part driving the mask to pick-up signals. The mask and coded disk is preferably driven by a rotary solenoid 53 which moves the mask disk 51 in discreet angular steps. The reasons for the coded disk will be gone into more thoroughly presently. To be able to accommodate various back focal lengths the mask height is adjustable by a slidable collar 52.

Between the mask disk 51 and shutters 44 and 43 are an aperture plate 54 and lens carrier 55 on which carrier are lenses 56. Three mirrors 57 are arranged in the optical axis 58 from transmitting the COM and MULSUP images from the tubes 40,41 and 42. Between the tubes 40,41 and 42 and mirrors 57 are in order an auxiliary shutter or shutters 59 lenses 60 and filters 61. A further balancing neutral density filter 62 is provided for the CON mode.

Adjacent the filter 62 a bottom plate 63 is provided is detachable from its pillar supports 64 (preferably three). The shutter blades and their bearings etc. are mounted on this plate. Double double-prong one rotating inside the other engage into hollows (or vice versa) on the shutter blades supports to constitute a drive when the two are pushed together. This arrangement not only permits easy access to the other parts of the mechanism when these are parted but also gives protection to the shutter blades and/or allows these to be quickly changed in the case of non-standard special requirements. For the same reason the format-MASK disk 51 has been placed at the other extreme end of the device. This as already has been mentioned above, and carries a standard variety of masks. It can be therefore seen that the whole device is quickly detachable from the camera by means of special lock devices such as oddy fasteners 65 or instant release screws which allows instant withdrawal of the whole mechanism from the main camera body for changing lenses, cleaning and adjustment.

Configuration FIG. 4 is the one to be used if in addition to CON/COM, superimposition, additions, corrections, combination of data, or the inter-marriage of several computers information, back projection etc. is needed or where data from several sources have to be compared, considered or inter-related. When simultaneous superimpositions are to take place semi-illuminised mirrors of the appropriate densities (these are on a turret with different degrees of illuminising) are used plus light intensity correction filters, for example, if brightness levels between the different input channels have to be in certain relations to each other or corrected. The arrangement just described provides CON/COM MULSUP the latter standing for multiple superimpositions. In the FIG. 4 arrangement the standard turret lens is constantly in operation and the auxiliary cathode ray tube lenses makes the necessay corrections of focus onto the cathode ray tube faces. The main shutter comes into operation if CON or CON + COM MULSUP is in operation. In COM MULSUP the mirror chamber is blacked-out and the semi-illuminised mirrors can act as true mirrors. In CON only all mirrors can be removed from the optical path. So that the duration of images (objects) need not be timed on the cathode ray tube faces electronically an auxiliary simple multiple slot shutter is incorporated into the light proofing housing. If the same, i.e., identical auxiliary correction lenses are used then it is cheaper in the above arrangement to effect focussing by slight movement of the cathode ray tubes and not by the lenses as is the more usual practice.

I claim:
1. A camera provided with a film carrier and film therein comprising a first object lense;
   a mask provided in the back focal plane of said first object lense;
   said first object lense being mounted on a rotatable lense carrier;
   means connected to said rotatable lense carrier for rotating said first object lense into and out of a first optical recording path leading to said film;
   at least one optical deflector rotatably mounted for movement into and out of said first optical recording path;
   at least one second object lense whose optical axis is directed along said first optical record path through said mask to said film by said optical deflector;
   means interconnecting said first object lense and said optical deflector for selecting the object lense and its source of images to be transmitted to said film.

2. A camera as in claim 1 wherein the camera is a microfiche camera.

3. A camera as claimed in claim 1 wherein the mask is provided on a mask plate which can be shifted to provide different size masks.

4. A camera as in claim 1 wherein the image source for said first object lense is a document copying station, and the optical path from said document copying station to said film is parallel to the axis of rotation of said lense carrier.

5. A camera as in claim 1 wherein the second object lense is at right angles to the first optical recording path, and said optical deflector is mounted to said lense carrier so that rotation of said lense carrier changes the source of the image to the film from said first object lense to said second object lense or vice-versa.

6. A camera as in claim 1 wherein the image source for said second object lense is a cathode ray tube.

7. A camera as in claim 1 wherein there is a plurality of first object lenses, a plurality of second object lenses and a plurality of optical deflectors.

8. A camera as in claim 7 wherein said first object lenses and said optical deflectors are positioned alternatively around said lense carrier.

* * * * *